US012595375B2

(12) United States Patent
Fan et al.

(10) Patent No.: US 12,595,375 B2
(45) Date of Patent: Apr. 7, 2026

(54) POLYSILOXANE-BASED COATING COMPOSITION

(71) Applicant: PPG Coatings (Kunshan) Co., Ltd., Jiangsu (CN)

(72) Inventors: Langfeng Fan, Jiangsu (CN); Jianfei Shi, Jiangsu (CN); Ping Jin, Jiangsu (CN); Lingyun Sun, Jiangsu (CN)

(73) Assignee: PPG Coatings (Kunshan) Co., Ltd., Jiangsu (CN)

( * ) Notice: Subject to any disclaimer, the term of this patent is extended or adjusted under 35 U.S.C. 154(b) by 427 days.

(21) Appl. No.: 18/247,278

(22) PCT Filed: Sep. 29, 2021

(86) PCT No.: PCT/CN2021/121526

§ 371 (c)(1),
(2) Date: Mar. 30, 2023

(87) PCT Pub. No.: WO2022/068841

PCT Pub. Date: Apr. 7, 2022

(65) Prior Publication Data

US 2023/0407102 A1 Dec. 21, 2023

(30) Foreign Application Priority Data

Sep. 30, 2020 (CN) ......................... 202011055746.4

(51) Int. Cl.

| | |
|---|---|
| ***C09D 4/06*** | (2006.01) |
| ***C09D 5/08*** | (2006.01) |
| ***C09D 7/63*** | (2018.01) |
| ***C09D 183/04*** | (2006.01) |
| ***C09D 183/10*** | (2006.01) |

(52) U.S. Cl.

CPC ................. *C09D 4/06* (2013.01); *C09D 5/08* (2013.01); *C09D 7/63* (2018.01); *C09D 183/04* (2013.01); *C09D 183/10* (2013.01)

(58) Field of Classification Search

CPC ... C09D 4/06; C09D 5/08; C09D 7/63; C09D 183/04; C09D 183/10; C08G 77/14; C08G 77/18; C08G 77/42

See application file for complete search history.

(56) References Cited

U.S. PATENT DOCUMENTS

| | | | | |
|---|---|---|---|---|
| 7,459,515 | B2 * | 12/2008 | Gommans | C08L 83/10 528/26 |
| 2006/0058451 | A1 | 3/2006 | Gommans et al. | |
| 2007/0213492 | A1 | 9/2007 | Mowrer et al. | |
| 2020/0291265 | A1 | 9/2020 | Murata et al. | |

FOREIGN PATENT DOCUMENTS

| | | | |
|---|---|---|---|
| CN | 106675133 | A | 5/2017 |
| WO | 2014164202 | A1 | 10/2014 |

OTHER PUBLICATIONS

International Search Report and Written Opinion received for PCT Application Serial No. PCT/CN2021/121526 dated Dec. 23, 2021, 8 pages.

* cited by examiner

*Primary Examiner* — Blaine Copenheaver

(57) ABSTRACT

The instant application relates to a polysiloxane-based coating composition, comprising: Polysiloxane of formula I wherein each $R_1$ is independently a hydroxyl group or an alkyl, aryl or alkoxy group having up to 6 carbon atoms, each $R_2$ independently is hydrogen or alkyl or aryl group having up to 6 carbon atoms, and n is selected so that the molecular weight for the polysiloxane is 400 to 10000; a non-aromatic epoxide resin having more than one 1, 2-epoxide group per molecule with an epoxide equivalent weight of 100 to 5000; a multi-functional (meth) acrylate monomer; and a cure system comprising at least one alkoxy functional aminosilane. Furthermore, it also relates to a method of coating surface using said coating composition and the substrate coated therewith.

(I)

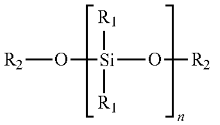

20 Claims, No Drawings

POLYSILOXANE-BASED COATING COMPOSITION

FIELD OF THE INVENTION

The present disclosure relates to a polysiloxane-based coating composition useful in protective coatings (in particular anti-corrosive coatings) and so on.

BACKGROUND

It is known in the art that polysiloxane resin per se is used as an anti-corrosive protective coating or as a desired resin additive in forming protective coatings. The addition of polysiloxane resin is beneficial to the properties including abrasion resistance, corrosive resistance and weathering resistance of the resulting cured coating films.

In practice, modifications are sometimes carried out on polysiloxane resins for the sake of further enhancing the desired properties and imparting new functions for polysiloxane resin coating, such as epoxide modifications or acrylate modifications, etc. Such coating films can be used to provide steel, concrete, aluminum and other structures with long term protections under a wide range of corrosive conditions (from atmospheric exposures to entire impregnation in strong corrosive solutions).

Epoxide resins are those having more than one 1,2-epoxide groups per molecule and may be saturated or unsaturated, aliphatic, cycloaliphatic, aromatic or heterocyclic. Epoxy resins generally comprise glycidyl ester or glycidyl ether groups, and have an epoxy equivalent of 100 to 5,000.

Compounds for acrylate modifications are a wide range of acrylate functionalized compounds, oligomers, polymers or resins, etc.

Therefore, the present disclosure provides a novel polysiloxane-based coating composition, which is improved in at least one of the following aspects: flexibility, weathering resistance, anti-corrosion, adhesion, chemical resistance and abrasion resistance.

SUMMARY OF INVENTION

The present disclosure provides a novel polysiloxane-based coating composition. According to a first aspect, the present disclosure provides a polysiloxane-based coating composition comprising a polysiloxane having the following formula:

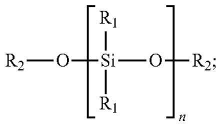

- a non-aromatic epoxide resin having more than one 1,2-epoxide group per molecule with an epoxide equivalent weight of 100 to 5000;
- a multi-functional (meth)acrylate monomer; and
- a cure system comprising at least one alkoxy functional aminosilane. In the above polysiloxane formula, each $R_1$ is independently a hydroxyl group or an alkyl, aryl or alkoxy group having up to 6 carbon atoms, each $R_2$ independently is a hydrogen or alkyl or aryl group having up to 6 carbon atoms, and n is selected so that the molecular weight for the polysiloxane is 400 to 10000.

The inventors have found that in the non-aromatic epoxide resin modified polysiloxane coating composition, the addition of a multi-functional (meth)acrylate monomer can further significantly improve the flexibility of the epoxide modified polysiloxane coatings, while at least maintaining or even possibly increasing the weathering resistance, abrasion resistance, chemical resistance, adhesion properties etc. thereof.

The present disclosure provides a polysiloxane-based coating composition, comprising, based on the total weight of the coating, 12 to 65% by weight of a polysiloxane having the following formula I:

(I)

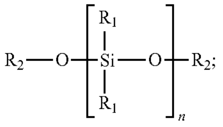

8 to 30% by weight of a non-aromatic epoxide resin having more than one 1,2-epoxide group per molecule with an epoxide equivalent weight of 100 to 5000; 1 to 12% by weight of a multi-functional (meth)acrylate monomer; up to 15% by weight of curing accelerator; up to 15% by weight of a flexible epoxy resin based on the glycidyl ether of castor oil having an epoxide equivalent weight of 200 to 1000; and 5 to 40% by weight of a curing system comprising at least one alkoxy functional aminosilane; and they are added in an amount sufficient to provide a ratio of an amino equivalent to the sum of epoxy equivalent plus double-bond equivalent in the multi-functional (meth)acrylate monomer of 0.7:1.0 to 1.3:1.0 in the coating composition. In polysiloxane of formula I, each $R_1$ is a hydroxyl group or an alkyl, aryl or alkoxy group having up to 6 carbon atoms, each $R_2$ is a hydrogen or an alkyl group or aryl group having up to 6 carbon atoms, and n is selected so that the molecular weight for the polysiloxane is 400 to 10,000.

The present disclosure provides a coated substrate, wherein the substrate comprises at least one surface coated at least in part with the polysiloxane-based coating composition herein.

The present disclosure also provides a method for protecting a surface of a substrate from the undesired effects brought out by one or more of chemicals, corrosion and weather by coating the surface with a coating composition prepared by the method comprising: preparing a binder part, adding a cure system to the binder part to form a fully cured polysiloxane-based coating composition, and applying the coating composition to the surface of a substrate to be protected before the coating composition becomes fully cured. The binder composition comprises a polysiloxane having the following formula I:

I

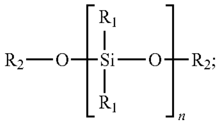

a non-aromatic epoxide resin having more than one 1,2-epoxide group per molecule with an epoxide equivalent weight of 100 to 5000; and a multi-functional (meth)acrylate monomer. In the polysiloxane formula, each $R_1$ is a hydroxyl group or alkyl, aryl or alkoxy group having up to 6 carbon atoms, each $R_2$ is a hydrogen or an alkyl or aryl group having up to 6 carbon atoms, and wherein n is selected so that the molecular weight of the polysiloxane is 400 to 10,000. The cure system comprise at least one alkoxy functional aminosilane; and optionally a curing accelerator.

DETAILED DESCRIPTION OF THE INVENTION

The present disclosure provides a polysiloxane-based coating composition, which may exhibit one or more improved properties, such as, but not limited to, improved weathering resistance, chemical resistance, anti-corrosion or oxidation resistance, and/or the improved flexibility in comparison with conventional epoxide modified polysiloxane coating composition.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of a singular term encompasses its plural counterpart and vice versa, unless indicated otherwise. In addition, in this application, the use of "or" means "and/or" unless specifically stated otherwise, even though "and/or" may be explicitly used in certain instances. "include" means "include, but not limited to".

As used herein, other than otherwise indicated, all numbers such as those for expressing values, ranges, or percentages may be understood as being modified the term "about", which is also the case even though the term does not explicitly appear. Accordingly, unless indicated to the contrary, the numerical values and ranges set forth in the following specification and attached claims may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The present disclosure provides for a polysiloxane-based coating composition suitable for coating a surface and providing improved flexibility, chemical resistance, anti-corrosion and/or weathering resistance as compared with other polysiloxane-based coatings. The polysiloxane-based coating can be advantageously formulated into two-part or multi-part coating systems, i.e., comprising a binder part A (at least comprising polysiloxane of formula I, a non-aromatic epoxide resin and a multi-functional (meth)acrylate monomer) and a cure system part B, wherein the combined composition reacts to form a crosslinked polysiloxane polymer structure. The coating composition can further comprise a flexible epoxy resin, for example, based on a glycidyl ether of castor oil. The coating composition can optionally comprise a curing accelerator comprising at least one metal catalyst.

With respect to the binder part A, it may, for example, comprise a blend of a polysiloxane of formula I, a non-aromatic epoxide resin and optionally an organooxysilane. The various components of binder part A comprise, but not limited to, those polysiloxanes having formula I:

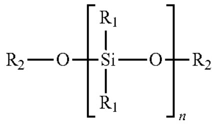

I wherein each $R_1$ may be selected from a hydroxyl group and alkyl, aryl and alkoxy group having up to 6 carbon atoms. Each $R_2$ may be selected from hydrogen and alkyl and aryl group having up to 6 carbon atoms. In formula I, n may be an integer selected so that the molecular weight of the polysiloxane is in the range of 400 to 10,000 Daltons. $R_1$ and $R_2$ may comprise groups having equal to or less than 6 carbon atoms, for example, to facilitate the rapid hydrolysis of the polysiloxane, which reaction may be driven by the volatility of the alcohol analog of the hydrolysis. $R_1$ and $R_2$ groups having greater than 6 carbon atoms may impair the hydrolysis of the polysiloxane due to the relatively low volatility of each alcohol analog. Methoxy, ethoxy and silanol functional polysiloxanes (having n selected so that their molecular weights are 400 to 2000) may be used in the coating composition of the present disclosure.

Suitable methoxy functional polysiloxanes may include: DOWSIL 3074, commercially available from Dow Corp.; or Silres IC232 and IC235, commercially available from Wacker. Silanol functional polysiloxanes include, but are not limited to, Dow's DC840, Z6018, Q1-2530 and 6-2230 intermediates.

The coating composition may comprise, based on its total weight, 12 to 65% by weight of polysiloxane of formula I. In other embodiments, the coating composition may comprise 18 to 55% by weight of polysiloxane of formula I. The coating composition may comprise approximately 20 to 45% by weight of polysiloxane of formula I. Alternatively, at least 80% by weight, such as at least 90% by weight or at least 95 or 98 to 100% by weigh of all polysiloxane components in said coating composition may comprise the polysiloxane of formula I.

Suitable epoxy resins useful in forming coating compositions of this disclosure include at least non-aromatic epoxide resins that contain more than one and in certain embodiments, two 1,2-epoxy groups per molecule. As used herein, the terms "epoxide resin" and "epoxy resin" are used interchangeably. The epoxide resins may be liquid rather than solid and may have an epoxide equivalent weight of 100 to 5,000, or in a range of 100 to 2,000, or 100 to 500, and have a reactivity of about two.

The non-aromatic epoxide resin may comprise a compound having one or more 1,2-epoxide groups bonded laterally or terminally to a cyclic, linear or branched aliphatic or cycloaliphatic hydrocarbyl group. Here, a non-aromatic hydrogenated epoxy resin, wherein cyclic, linear or branched aliphatic or cycloaliphatic hydrocarbyl group is hydrogenated or saturated, are particularly suitable. It is possible that the cyclic, linear or branched aliphatic or cycloaliphatic hydrocarbyl group comprising C and H does not comprise heteroatoms such as O, N or P etc. In addition, said cyclic, linear or branched hydrocarbyl group may, for example, have 2 to 500, such as 5 to 300 or 200 or 100 carbon atoms.

The epoxide resins may be a non-aromatic hydrogenated epoxy resin, such as a non-aromatic hydrogenated cyclohexane dimethanol and diglycidyl ethers of hydrogenated Bisphenol A-type epoxide resin, such as Eponex 1510, and Eponex 1513 (hydrogenated bisphenol A-epichlorohydrin epoxy resin) commercially available from Hexion; Santolink LSE-120 commercially available from Monsanto, Springfield, MA.; Epodil 757 (cyclohexane dimethanol diglycidylether) commercially available from Pacific Anchor, AUentown, PA; Araldite XUGY358 and PY327 commercially available from Ciba Geigy, Hawthorne, NY; Epirez 505 commercially available from Rhone-Poulenc, Lousiville, KY; Aroflint 393 and 607 commercially available from Reichold, Pensacola, FL; and ERL4221 commercially available from Union Carbide, Tarrytown, NY. Other suitable non-aromatic epoxide resin may include EP-4080E (cycloaliphatic epoxy resin) commercially available from Adeka, Japan; ST-3000, commercially available from KUKDO CHEMICAL; DER732 and DER736. The epoxy resin may be EP-4080E. Such non-aromatic hydrogenated epoxide resins may be desired for their limited reactivity of about two, which promote formation of a linear epoxy polymer and prohibits formation of a cross-linked epoxy polymer. Without intending to be limited to a specific interpretation, it is believed that the resulting linear epoxy polymer formed by adding the hardener to the epoxide resin may be at least partially responsible for the enhanced weatherability of this composition.

The coating composition according to the present disclosure uses a non-aromatic epoxide resin, because it may exhibit better weathering resistance, no yellowing, suitable viscosity and curing speed, compared with other epoxy resins or epoxy acrylic resins.

Based on the total weight of the coating composition, the coating composition may comprise 8 to 30% by weight, such as 10-25% by weight, or 10-22% by weight of non-aromatic epoxide resins, more preferably non-aromatic hydrogenated epoxy resins.

The coating composition of the present invention also comprises a multi-functional (meth)acrylate monomer. In the formulation of two-part or multi-part composition, the multi-functional (meth)acrylate monomer is contained in binder part A. Herein, said multi-functional (meth)acrylate monomer refers to the non-polymerized monomer compound having at least 2, 3 or 4 or more (meth)acrylate groups. Advantageously, multi-functional (meth)acrylate monomers suitable for the present invention are monomer compounds having at least 2, 3 or 4 or more (meth)acrylate groups bonded laterally or terminally to the backbone formed by cyclic, linear or branched aliphatic or cycloaliphatic hydrocarbon groups, wherein said aliphatic or cycloaliphatic hydrocarbon group comprises C and H atoms and optionally one or more, such as 2 or 3, heteroatoms, such as O, or alternatively does not contain heteroatoms. In some suitable cases, said H atoms may be substituted by, for example, halogens.

Generally, said multi-functional (meth)acrylate monomer can be formed by the esterification reactions from the aliphatic or cycloaliphatic alcohols corresponding to the above defined aliphatic or cycloaliphatic hydrocarbyl with (meth)acrylic acid. In addition, advantageously, the multi-functional (meth)acrylate monomers suitable for the present invention, apart from (meth)acrylate functional groups, do not have additional functional groups, such as amino, ester, carbonyl, urethane and epoxy etc. Therefore, apparently, according to such definitions, for example, those epoxy (meth)acrylate based on aromatic epoxy resins or polyurethane (meth) acrylate are not multi-functional (meth)acrylate monomers of the present invention.

The examples of suitable multi-functional (meth)acrylate monomers include trimethylolpropane tri(meth)acrylate, tripropylene glycol tri(meth)acrylate, dipropylene glycol di(meth)acrylate, butanediol di(meth)acrylate, cyclohexane dimethanol di(meth)acrylate, hexanediol di(meth)acrylate, glocerin tri(meth)acrylate, pentaerythritol tetra(meth)acrylate, bistrimethylolpropane tri(meth)acrylate, neopentyl glycol di(meth)acrylate, neopentyl glycol propoxylate di(meth) acrylate, ethoxylated trimethylolpropane tri(meth)acrylate, and propoxylated glycerol tri(meth)acrylate.

Suitable multi-functional (meth)acrylate monomers include hexanediol diacrylate, such as 1, 6 HEXANEDIOL DIACRYLATE (from ALLNEX), AGISYN 2816 (from DSM), SR238 (from ARKEMA INC), PHOTOMER4017 (from IGM RESINS); trimethylolpropane triacrylate, for example commercially available under trade name Photomer 4006 from Cognis, Exton, Pa.; neopentyl glycol propoxylate diacrylate, for example commercially available under trade name Photomer 4126 and 4127 from IGM; ethoxylated trimethylolpropane triacrylate, for example commercially available under trade name Photomer 4129 from IGM; and propoxylated glycerol triacrylate, for example commercially available under trade name Photomer 4094 from IGM.

On the basis of the total weight of the coating composition, the coating composition may comprise 1 to 12% by weight, such as 2 to 8% by weight, or such as 4 or 7% by weight of multi-functional (meth)acrylate monomers. It is possible that the coating composition of the present invention is substantially free or completely free of epoxy (meth) acrylate and polyurethane (meth)acrylate (containing acrylic functional group and urethane linkage). "Substantially free" as used in this context means less than 5 wt %, such as less 1 wt %, based on total weight of the composition; "completely free" as used in this context means no more than trace amounts, particularly those that would be introduced through impurities of other components.

The various embodiments coating compositions according to the present disclosure comprise a cure system. When formulated into two-part or multi-part coating composition, the cure system is contained in component B. The cure system comprises one or more alkoxy functional aminosilanes. One or more alkoxy functional aminosilane may have an average alkoxy functionality value of for example 2.0 or more, or 2.2 or more, or 2.5 or more. On the basis of the total weight of the coating composition, the cure system may comprise 5 to 30% by weight of the coating composition, or may comprise 10 to 20% by weight of the coating composition, such as about 14% by weight. The addition amount of the cure system is typically sufficient to provide a ratio of an amino equivalent to the sum of epoxy equivalent plus double-bond equivalent in the multi-functional (meth)acrylate monomer of 0.7:1.0 to 1.3:1.0 in the coating composition, or a ratio is in a range from 0.95:1.00 to 1.05:1.00.

The alkoxy functional aminosilane may comprise at least one dialkoxy functional amino silane and/or at least one trialkoxy functional amino silane, such as a trialkoxy functional amino silane.

The at least one dialkoxy functional aminosilane may have a structure:

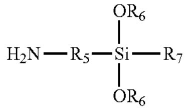

According to the structure of dialkoxy functional aminosilanes, $R_5$ may be a difunctional organic radical independently comprising aryl, alkyl, dialkylaryl, alkoxyalkyl, alkylaminoalkyl, and cycloalkyl radicals, each alkyl, aryl, cycloalkyl, and alkoxy group containing up to 6 carbon atoms, and each $R_6$ and $R_7$ may be independently selected from alkyl, hydroxyalkyl, alkoxyalkyl or hydroxyalkoxyalkyl groups wherein each alkyl, aryl, cycloalkyl, and alkoxy group in the $R_6$ and $R_7$ groups contain up to 6 carbon atoms. Each $R_6$ and $R_7$ group may be independently chosen from $(C_1$-$C_6)$alkyl groups and each $R_5$ may be independently chosen from $(C_1$-$C_6)$alkyl groups and $(C_1$-$C_6)$alkylamino $(C_1$-$C_6)$alkyl groups. For example, suitable dialkoxy functional aminosilanes may include aminopropyl methyldimethoxysilane, aminopropylethyl dimethoxysilane, aminopropylethyl diethoxysilane, N-β-aminoethyl-γ-aminopropylmethyl dimethoxysilane, N-2-aminoethyl-3-aminoisobutyl-methyl dimethoxysilane, and aminoneohexylmethyl dimethoxysilane. Examples of suitable commercially available dialkoxy functional aminosilanes include DYNASYLAN® 1505 (aminopropylmethyl dimethoxysilane having an amine equivalent weight of 81.57, commercially available from Evonik Degussa Corp., USA) and SILQUEST® A-2639 (aminoneohexylmethyl dimethoxysilane having an amine equivalent weight of 102.7, commercially available from Momentive performance materials, and SILQUEST® A-2120 (N-β-(aminoethyl)-γ-aminopropyl methyl dimethoxysilane).

The trialkoxy functional aminosilane can have the following general formula

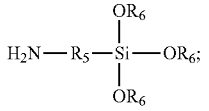

wherein $R_5$ comprises one of the following difunctional organic radical: aryl, alkyl, dialkylaryl, alkoxyalkyl, alkylaminoalkyl, or cycloalkyl radicals, each $R_6$ independently is alkyl, hydroxyalkyl, alkoxyalkyl or hydroxyalkoxyalkyl groups containing less than 6 carbon atoms. Each $R_6$ group may be independently selected from $(C_1$-$C_6)$ alkyl groups and each $R_5$ independently selected from $(C_1$-$C_6)$ alkyl groups and $(C_1$-$C_6)$ alkyl amino $(C_1$-$C_6)$ alkyl groups.

Suitable trialkoxy functional aminosilanes may include aminopropyl trimethoxysilane, aminopropyl triethoxysilane, aminopropyl tripropoxysilane, aminoneohexyl trimethoxysilane, N-β-(aminoethyl)-γ-aminopropyl trimethoxysilane, N-β-(aminoethyl)-γ-aminopropyl triethoxysilane, N-phenylaminopropyl trimethoxysilane, trimethoxysilylpropyl diethylene triamine, 3-(3-aminophenoxy)propyl trimethoxysilane, aminoethyl aminomethyl phenyl trimethoxysilane, 2-aminoethyl-3-aminopropyl-tris-2-ethylhexoxysilane, N-aminohexyl aminopropyl trimethoxysilane, and trisaminopropyl trismethoxy ethoxy silane. Examples of suitable commercially available trialkoxy functional aminosilanes include SILQUEST® A-1100, KH-540 (aminopropyltrimethoxysilane having an amine equivalent weight of 89.7), SILQUEST® A-1110, KH-550 (aminopropyltriethoxysilane having an amine equivalent weight of 111), SILQUEST® A-1120 (N-β-(aminoethyl)-γ-aminopropyl trimethoxysilane), and SILQUEST® A-1637, commercially available from Momentive performance materials. Other suitable trialkoxy functional aminosilanes include those set forth in U.S. Pat. No. 7,459,515 at column 10, lines 38-65, incorporated herein by this reference.

Where the cure system comprises a blend of at least one dialkoxy functional aminosilane and at least one trialkoxy functional aminosilane, the aminosilanes are mixed together in a ratio to provide the desired average alkoxy functionality value. The at least one dialkoxy functional aminosilane may have an average alkoxy functionality value of about 2.0 and the at least one trialkoxy functional aminosilane may have an average alkoxy functionality value of about 3.0 and the blend of the alkoxy aminosilanes may have an average alkoxy functionality value ranging from about 2.2 to 2.8. For example, the blend may comprise from 10% to 90% by weight or from 27% to 73% by weight of the dialkoxy functional aminosilane and from 90% to 10% by weight or from 72% to 28% by weight of the trialkoxy functional aminosilane, based on the total weight of aminosilane in the blend.

However, at least 80% by weight, such as at least 85% by weight, or at least 90% by weight, or at least 95% by weight or 98% by weight or 100% by weight of said cure system may comprise the above said alkoxy functional aminosilanes, a particular example of which is trialkoxy functional aminosilanes. It has been found that, in particular in the presence of trialkoxy functional aminosilane and multifunctional (meth)acrylate, said polysiloxane-based coating composition can well combine a rapid curing rate and an improved flexibility without any disadvantageous affections.

The cure system may further comprise a curing accelerator. The curing accelerator may be a metal catalyst in the form of an organometallic catalyst comprising the one or more metal. Curing accelerators comprising at least one organometallic catalyst may be useful for the purpose of further accelerating the curing rate of the coating composition into a protective film coating over a broad temperature range. In certain uses requiring an ambient temperature cure of the coating composition, the organometallic catalyst curing accelerator may provide accelerated curing rates at the ambient temperature. Suitable curing accelerator may include at least one metal catalyst comprising a metal selected from zinc, manganese, zirconium, titanium, cobalt, iron, lead, bismuth, or tin and having the formula

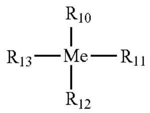

where "Me" is the metal, $R_{10}$ and $R_{11}$ may be independently selected from acyl, alkyl, aryl or alkoxy groups, wherein the acyl, alkyl, aryl and alkoxy groups may each have up to twelve carbon atoms. $R_{12}$ and $R_{13}$ may be selected from those groups set forth for $R_{10}$ and $R_{11}$ or from inorganic atoms such as halogens, sulfur or oxygen. The $R_{10}$, $R_{11}$, $R_{12}$ and $R_{13}$ groups may be selected from butyl, acetates, laurates, octanoates, neodecanoates or naphthanates. The curing accelerator may be an organometallic tin catalyst or titanium catalyst, such as dibutyl tin dilaurate, dibutyl tin diacetate, dibutyl tin diacetyldiacetonate, dioctyltin dilaurate, dioctyltin diacetate, or organotitanates such as tetrabutyl titanate. Suitable metal catalysts are commercially available, for example TYZOR TNBT TITANATE available from DORF KETAL CHEMICALS and FASCAT 4200 available from PMC ORGANOMETALLIX INC. The cure system may comprise up to 10% by weight of the curing accelerator, and in other embodiments from 0.02% to 7% by weight of the curing accelerator, based on the total weight of the cure system.

In the epoxy polysiloxane coating composition of the present disclosure, when formulated into two-part or multi-part coating composition, the weight ratio of binder part A and cure system part B can be advantageously in a range from 70:30 to 90:10, such as from 75:25 to 87:13.

The coating compositions of the present disclosure may further comprise a flexible epoxy resin, such as a flexible resin based on the glycidyl ether of castor oil, CAS No. 74398-71-3. For example, the flexible epoxy resin may be a glycidyl ether of castor oil having an epoxide equivalent of 200 to 1,000. Examples of suitable glycidyl ethers of castor oil include, but are not limited to, Heloxy™ 505, a castor oil polyglycidyl ether having an epoxide equivalent of 200 to 500, commercially available from Momentive Specialty Chemicals, Columbus, OH, as well as other commercially available castor oil polyglycidyl ethers under CAS No. 74398-71-3. Other suitable flexible epoxy resins may include Erisys GE-22 diglycidylether of cyclohexanedimethanol, Erisys GE-36 diglycidylether of polyoxypropyleneglycol, Erisys GE-60 sorbitol glycidyl ether (the Erisys line of diglycidyl ethers are commercially available from CVC Specialty Chemicals, Moorestown, NJ) and CoatOSil* 2810 diepoxy functional polydimethylsiloxane (commercially available from Momentive Specialty Chemicals, Columbus, OH). The flexible epoxy resin may be included in the coating composition where the coating composition comprises up to 15% by weight of the flexible epoxy resin. In other embodiments, the coating composition may comprise from 2% to 15% by weight of the flexible epoxy resin, or even from 5% to 11% by weight of the flexible epoxy resin.

The coating composition may optionally comprise one or more organooxysilane. With respect to the optional organooxysilane used in certain embodiments, the organooxysilane may have the general formula:

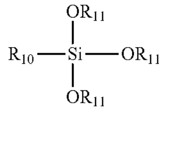

where $R_{10}$ may be selected from alkyl or cycloalkyl groups containing up to six carbon atoms or aryl groups containing up to ten carbon atoms. $R_{11}$ is independently selected from alkyl, hydroxyalkyl, alkoxyalkyl or hydroxyalkyoxyalkyl groups containing up to six carbon atoms. $R_{11}$ may comprise groups having up to six carbon atoms, for example, to facilitate rapid hydrolysis of the organooxysilane, which reaction may be driven by the evaporation of the alcohol analog product of the hydrolysis. Without intending to be limited, it is believed that $R_{11}$ groups having greater than six carbon atoms may impair the hydrolysis of the organooxysilane due to the relatively low volatility of each alcohol analog. In specific embodiment comprising the organooxysilane, the silane may be a trialkoxysilane, such as Union Carbide's A-163 (methyl trimethoxysilane), A-162, and A-137 and Dow Corning's Z6070 and Z6124. Those formulations that may comprise an organooxysilane, the coating composition may comprise from 0.1% to 10% by weight of the organooxysilane. The coating composition may optionally comprise 0.7% to 10% by weight of organooxysilane or even from 1% to 5% by weight organooxysilane.

The coating compositions may comprise one or more other components, including but not limited to, corrosion inhibitors, moisture scavengers, pigments, fillers, rheological modifiers, plasticizers, antifoam agents, adhesion promoters, suspending agents, levelling agents, thixotropic agents, catalysts, pigment wetting agents, bituminous and asphaltic extenders, antisettling agents, diluents, UV light stabilizers, air release agents, dispersing aids, solvents, surfactants, or mixtures of any thereof. One of ordinary skill in the resin coating compositions art would understand that other common components may be incorporated into the coating composition within the scope of the various embodiments of the disclosures described herein. When being formulated into a two-part or multi-part coating composition, these other components listed above can be selected as necessary and be included in any of the parts, for example, can be advantageously included in binder part A. Based on the total weight of the coating composition, the polysiloxane coating composition can comprise up to 80% by weight, such as up to 65% by weight, 50% by weight, 30% by weight, 20% by weight or 10% by weight of such a component.

The coating composition may additionally comprise one or more corrosion inhibitors. Examples of suitable corrosion inhibitors include, but are not limited to, zinc phosphate based corrosion inhibitors, for example, micronized HALOX® SZP-391, HALOX® 430 calcium phosphate, HALOX® ZP zinc phosphate, HALOX® SW-111 strontium phosphosilicate, HALOX® 720 mixed metal phosphor-carbonate, and HALOX® 550 and 650 proprietary organic corrosion inhibitors commercially available from Halox, Hammond, IN. Other suitable corrosion inhibitors may include HEUCOPHOS® ZPA zinc aluminum phosphate and HEUCOPHOS® ZMP zinc molybdenum phosphate, commercially available from Heucotech Ltd, Fairless Hills, PA. Corrosion inhibitors may be included into the coating composition in amounts of 1% to 7% by weight. Various embodiments of the coating composition may additionally comprise one or more light stabilizers, such as liquid hindered amine light stabilizers ("HALS") or UV light stabilizers. Examples of suitable HALS include, for example, TINUVIN® HALS compounds such as TINUVIN® 292, TINUVIN® 123, TINUVIN® 622, TINUVIN® 783, TINUVIN® 770 commercially available from BASF, Ludwigshafen, Germany. Examples of suitable UV light stabilizers include, for example, CYASORB® light stabilizers, such as CYASORB® UV-1164L (2,4-bis(2,4-di methylphenyl)-6-(2-hydroxy-4-isooctyloxyphenyl)-1,3,5-triazine), commercially available from Cytec Industries, Woodland Park, NJ, and TINUVIN® 1130 and TINUVIN® 328 commercially available from BASF, Ludwigshafen, Germany. The one or more light stabilizer may be included into the coating composition in amounts of 0.25% to 4.0% by weight.

Suitable pigments for certain embodiments of the coating compositions may comprise organic or inorganic color pigments and may include, for example, titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like. The amount of pigment that may be used to form the composition is understood to vary, depending on the particular composition application, and can be zero when a clear composition is desired. In various embodiments, the epoxy polysiloxane composition may comprise up to 50 percent by weight fine particle size pigment and/or filler. Using greater than 50 percent by weight of fine particle size pigment and/or filler ingredient may produce a composition that can be too viscous for application. Where it is desirable to have more than 50% pigment or filler in the final composition, such as a zinc rich primer which contains up to 90% zinc in the dry film or flooring composition which may contain up to 80% of pigment/filler, the pigment or filler may be packaged separately as a third part. Depending on the particular end use, the coating compositions disclosed herein may comprise from 20% to 35% by weight of fine particle size filler and/or pigment.

The pigment and/or filler ingredient may typically be added to the part A containing the binder component, for example, by dispersing with a gear dispersing disc to a maximum grind fineness of 30 μm, or alternatively may be ball milled or sand milled to the same grind fineness before addition of the polysiloxane ingredient. Selection of a fine particle size pigment or filler and dispersion or milling to 30 μm allows for the atomization of mixed binder resin and cure components with conventional air, air-assisted airless, airless and electrostatic spray equipment, and may provide a smooth, uniform surface appearance after application.

The polysiloxane-based coating compositions of this disclosure may be formulated for application with conventional air, airless, air-assisted airless and electrostatic spray equipment, brush, or roller. Certain embodiments of the compositions may be used as protective coatings for steel, galvanizing, aluminum, concrete and other substrates at dry film thicknesses in the range of from 25 microns to two millimeters. Accordingly, pigment or filler ingredients useful in forming the composition of the present disclosure may comprise a fine particle size material, for example but not limited to, having at least 90 weight % greater than 1250 mesh sieve size.

The coating composition can be formulated to contain no water, in particular no intentionally added water. However, the coating composition needs water during the curing process. The required water can come from air moisture. Thus, it is moisture curing.

The polysiloxane-based compositions according to various embodiments of the present disclosure are generally low in viscosity and can be spray applied without the addition of a solvent. However, in certain embodiments organic solvents may be added to improve atomization and application with electrostatic spray equipment or to improve flow, leveling and/or appearance when applied by brush, roller, or standard air and airless spray equipment. Exemplary solvents useful for this purpose include, but are not limited to, esters, ethers, alcohols, ketones, glycols and the like. In certain embodiment, the amount of solvent added to compositions of the present disclosure may be limited by government regulation under the Clean Air Act to approximately 420 grams solvent per liter of the composition.

The coating composition of the present disclosure can be supplied as a multi-part system comprising at least two-parts or two-packages. By "multi-part system", a term well known in coating art, it means that the ingredients of a coating composition are formulated into multiple parts or components, and then each parts or components are separately packed in different containers, such as moisture-proof containers. In said multi-part system, a first package (i.e., first part or binder part A) can comprise said polysiloxane of formula I, said non-aromatic epoxide resin, said multi-functional (meth)acrylate monomer, any pigment and/or filler ingredient, additive and/or solvent (if desired). A second package (i.e., second part or cure system part B) comprise one or more alkoxy functional aminosilanes and optionally a curing accelerator. The coating compositions in certain embodiments of present disclosure also can be provided as 3-part or 3-part systems, wherein pigment and/or filler or other additives are supplied in a separate package or part e.g. for a flooring/concrete protection formulation or a zinc-rich primer coating.

The coating compositions according to the present disclosure can be applied and fully cure at ambient temperature conditions in the range of from −6° C. to 50° C. At temperatures below −18° C. cure may be slowed. However, the coating compositions of various embodiments of the present disclosure may be applied under bake or cure temperatures up to 40° C. to 120° C.

The epoxy resin in the binder part and the multi-functional (meth)acrylate monomers may be cured with sufficient cure system where the primary amino groups on the silane react with the double bonds of acrylic monomers through Michael's addition under the opening of the double bond with a reaction rate faster than the curing rate of the hydrogenated epoxy resin, while amine hydrogens react with the epoxide group of the epoxy resin to form epoxy chain polymers and to react with the polysiloxane to form polysiloxane polymers, where the epoxy chain polymers and polysiloxane polymers may copolymerize to form the cured cross-linked epoxy polysiloxane polymer composition.

The epoxy resin and the multi-functional (meth)acrylate monomer component can be cured by sufficient cure system to provide from 0.7 to 1.3 amine equivalent weight, preferably 0.8 to 1.1 amine equivalent weight per 1.0 of the sum of epoxy equivalent plus double-bond equivalent in the multi-functional (meth)acrylate monomer.

The coating compositions according to the present disclosure may display one or more enhancement of improved flexibility, excellent corrosion resistance, weathering resistance, abrasion resistance, chemical resistance, and allows recoatability as compared to conventional epoxy-polysiloxane coating compositions. The polysiloxane coating compositions of the present disclosure may exhibit an unexpected and surprising improvement in chemical corrosion and weathering resistance as well as high tensile and compressive strength, flexibility, and excellent impact and abrasion resistance.

The present disclosure also includes a coated substrate comprising a substrate having at least one surface coated at least in part with a coating composition as described herein. Coating compositions of the present disclosure may be applied to a desired substrate surface to protect it from weathering, impact, and/or exposure to corrosion and/or chemical(s). Illustrative substrates that may be treated using the coating compositions described herein include, but are not limited to, wood, plastic, concrete, vitreous surfaces, and metallic surfaces. Coating compositions according to the embodiments described herein may find use as a top coating disposed either directly onto the substrate surface itself or disposed onto one or more prior or other underlying coating, e.g., an inorganic or organic primer coating, disposed on the substrate surface to achieve a desired purpose.

The present disclosure further provides a method for protecting a surface of a substrate from the undesired effects of one or more of chemical(s), corrosion, and/or weather by coating at least a portion of one surface of the substrate with a coating composition prepared by a method comprising forming a binder part, adding a cure system to the binder part to form a fully cured polysiloxane coating composition, and applying the coating composition to the at least one surface of the substrate to be protected before the coating composition becomes fully cured. The binder part may be formed by combining a polysiloxane having formula I, a non-aromatic epoxide resin and multi-functional (meth)acrylate monomers. The cure system may be as described herein and may comprise at least one alkoxy functional aminosilane and optionally a catalyst and/or cure accelerator. The cure system may have an amine equivalent weight ranging from 112 to 250 g/NH. The binder part may further include a flexible epoxy resin based on a glycidyl ether of castor oil having an epoxide equivalent weight in the range of 200 to 1,000.

Coating compositions of the various descriptions provided herein can be applied to a surface to be treated by conventional techniques such as spraying or brushing or the like, and are usually applied in films of from 25 to 250 microns in thickness, but could be up to 1.5 millimeters in thickness. If desired, multiple layers of the coating composition may be applied to the surface to be protected. For example, for use with a wooden substrate, such as in the furniture industry, the coating may be applied with a dry film thickness of 75 to 125 microns to provide a desired degree of protection to the underlying surface. On other surface structures, coatings of appropriate thickness may be applied to provide the desired level of protection. The coating composition, once applied to the at least one surface of the substrate may be allowed to cure at ambient temperature until fully cured or, alternatively, may be cured at an elevated temperature, from ambient temperature up to 150° C.-200° C., for example, by placing the coated substrate in a drying or curing oven. The substrate may be removed from the oven after complete curing of the coating composition or after partial curing of the coating composition, after which the coating composition may continue to cure on the substrate at ambient temperature until complete cure is attained.

These and other features of the present disclosure will become more apparent upon consideration of the following examples. The following examples are not to be considered as limiting the disclosure to their details. All parts and percentages in the examples, as well as throughout this specification, are by weight unless otherwise indicated.

EXAMPLES

The following examples describe the preparation of various formulations of the coating composition as used for coating purposes.

In these Examples, exemplary epoxy siloxane coating systems according to the present disclosure were formulated and tested for drying property, abrasion resistance, flexibility, weathering resistance, corrosion resistance and chemical resistance, and compared with comparative coating systems.

Example 1—Preparation of Binder Part A1

Binder part A1 for the inventive formulation was prepared as follows using the individual ingredients and weight parts as shown in Table 1: a hydrogenated bisphenol A epoxy resin (EPONEX 1510, 190 g, commercially available from Hexion) were weighed into a 1-liter stainless steel mixing vessel which was placed in a highspeed dispersing machine equipped with a gear dispersing disc. A thixotropic agent (MONORAL 8800K, 10 g, commercially available from HS CHEM CO LTD) was added into the mixing vessel under stirring, while keeping high speed dispersed for 10 minutes, followed by the addition of a surfactant (DISPERBYK-182, 5 g, commercially available from BYK). Next, the pigments titanium dioxide powders (BLR-895, 250 g, commercially available from LOMON BILLIONS) and fillers (1250 mesh barium sulfate, 120 g) were added and highspeed dispersed, while the mixture temperature reached to 65° C. and was kept for 30 minutes, until a fineness below 30 μm was obtained. Afterwards, a multi-functional (meth)acrylate monomer (1,6-hexanediol diacrylate, 50 g, commercially available from Allnex), a polysiloxane resin (Dowsil 3074, 250 g, commercially available from Dow), defoamer (TEGO FOAMEX N, 3 g, TEGO FOAMEX 840, 2 g, commercially available from EVONIK), leveling agent (Dowsil 57 additive, 5 g, commercially available from Dow), light stabilizer (TINUVIN 292, 15 g, commercially available from BASF), a flexible epoxy resin (HELOXY 505, 40 g, commercially available from Hexion) and solvent (Xylene, 70 g) were added under low speed stirring until homogeneously mixed. Then the mixture was poured into an iron jug and stored as Binder part A1.

Example 2—Preparation of Binder Part A2

Binder part A2 for the inventive formulation was prepared as follows using the individual ingredients and weight parts as shown in Table 1: a hydrogenated bisphenol A epoxy resin (EPONEX 1510, 220 g, commercially available from Hexion) were weighed into a 1-liter stainless steel mixing vessel which was placed in a highspeed dispersing machine equipped with a gear dispersing disc. A thixotropic agent (DISPARLON 6500, 13 g, commercially available from KUSUMOTO CHEMICALS) was added into the mixing vessel under stirring, while keeping high speed dispersed for 10 minutes, followed by the addition of a surfactant (RHODAFAC RE-610, 5 g, commercially available from SOLVAY). Next, the pigments titanium dioxide powders (BLR-895, 250 g, commercially available from LOMON BILLIONS) and fillers (1250 mesh barium sulfate, 120 g) were added and highspeed dispersed, while the mixture temperature reached to 65° C. and was kept for 30 minutes, until a fineness below 30 μm was obtained. Afterwards, a multi-functional (meth)acrylate monomer (1,6-hexanediol diacrylate, 75 g, commercially available from Allnex), a polysiloxane resin (Dowsil 3074, 240 g, commercially available from Dow), defoamer (TEGO FOAMEX N, 3 g, TEGO FOAMEX 840, 2 g, commercially available from EVONIK), leveling agent (Dowsil 57 additive, 5 g, commercially available from Dow), light stabilizer (TINUVIN 292, 15 g, commercially available from BASF) and solvent (Xylene, 52 g) were added under low speed stirring until homogeneously mixed. Then the mixture was poured into an iron jug and stored as Binder part A2.

Example 3—Preparation of Comparative Example Binder Part AR1

It was prepared similar to the preparation procedure as set forth for binder part A2 of the inventive coating composition using the individual ingredients and weight parts as shown in Table 1, with the difference that an epoxy acrylic resin (SETALUX-8503-SS-60, 50 g, commercially available from Allnex) was added in the formulation.

Example 4—Preparation of Comparative Example Binder Part AR2

It was prepared similar to the preparation procedure as set forth for binder part A2 of the inventive coating composition using the individual ingredients and weight parts as shown in Table 1, with the difference that an epoxy acrylic resin (SETALUX-8503-SS-60, 100 g, commercially available from Allnex) was added in the formulation.

Example 5—Preparation of Comparative Example Binder Part AR3

It was prepared similar to the preparation procedure as set forth for binder part A2 of the inventive coating composition using the individual ingredients and weight parts as shown in Table 1, with the difference that the multifunctional (meth)acrylate monomer was replaced with the equal amount of a polyurethane acrylic resin (Photomer 6008, commercially available from IGM) in the formulation.

Example 6—Preparation of Comparative Example Binder Part AR4

It was prepared similar to the preparation procedure as set forth for binder part A2 of the inventive coating composition using the individual ingredients and weight parts as shown in Table 1, with the difference that a polyurethane acrylic resin (Photomer 6008, 50 g, commercially available from IGM) was added in the formulation.

Example 7—Preparation of Comparative Example Binder Part AR5

It was prepared similar to the preparation procedure as set forth for binder part A2 of the inventive coating composition using the individual ingredients and weight parts as shown in Table 1, with the difference that the amount of 1,6-hexanediol diacrylate was increased, while decreasing the amount of hydrogenated bisphenol A epoxy resin in the formulation.

TABLE 1

Binder part formulations

| Ingredient | Description | A1 | A2 | AR1 | AR2 | AR3 | AR4 | AR5 |
|---|---|---|---|---|---|---|---|---|
| | | Weight, g | | | | | | |
| Hydrogenated bisphenol A epoxy resin | EPONEX 1510 | 190 | 220 | 220 | 220 | 220 | 220 | 160 |
| Surfactant | DISPERBYK-182 | 5 | — | — | — | — | — | — |
| Surfactant | RHODAFAC RE-610 | — | 5 | 5 | 5 | 5 | 5 | 5 |
| Defoamer | TEGO FOAMEX N | 3 | 3 | 3 | 3 | 3 | 3 | 3 |
| Defoamer | TEGO FOAMEX 840 | 2 | 2 | 2 | 2 | 2 | 2 | 2 |
| Thixotropic agent | MONORAL 8800K | 10 | — | — | — | — | — | — |
| Thixotropic agent | DISPARLON 6500 | — | 13 | 13 | 13 | 13 | 13 | 13 |
| Pigment | BLR-895 | 250 | 250 | 250 | 250 | 250 | 250 | 250 |
| Filler | Barium sulfate | 120 | 120 | 120 | 120 | 120 | 120 | 120 |
| Multi-functional (meth)acrylate monomer | 1,6-hexanediol diacrylate | 50 | 75 | 75 | 75 | — | 75 | 170 |
| Epoxy acrylic resin | SETALUX-8503-SS-60 | — | — | 50 | 100 | — | — | — |
| Polyurethane acrylic resin | Photomer 6008 | — | — | — | — | 75 | 50 | — |
| Polysiloxane resin | Dowsil 3074 | 250 | 240 | 240 | 240 | 240 | 240 | 240 |
| Light stabilizer | TINUVIN 292 | 15 | 15 | 15 | 15 | 15 | 15 | 15 |
| Leveling agent | Dowsil 57 additive | 5 | 5 | 5 | 5 | 5 | 5 | 5 |
| Flexible epoxy resin | HELOXY 505 | 40 | — | — | — | — | — | |
| Solvent | Xylene | 70 | 52 | 52 | 52 | 52 | 52 | — |
| Total | | 1000 | 1000 | 1050 | 1100 | 1000 | 1050 | 983 |

Preparation of Cure System Part B

The cure system parts B1 and B2 according to the formulations of the present disclosure were prepared. The ingredients and amounts thereof of each cure system are given in Table 2. Said ingredients were weighed into a 0.5-liter vessel and were sealed and placed on a shaker for 5 minutes under nitrogen protection, thereby providing cure systems 1, 2 and comparative cure system 3.

Cure system B1 was prepared by mixing trialkoxy functional aminosilanes (KH-550, 68 g, KH-540, 27 g, commercially available from Chenguang Paint, Jiangsu Province) and a metal catalyst (TYZOR TNBT TITANATE, 5 g, commercially available from DORF KETAL CHEMICALS).

Cure system B2 was prepared by mixing trialkoxy functional aminosilanes (KH-550, g, KH-540, 27.97 g, commercially available from Chenguang Paint, Jiangsu Province) and a metal catalyst (FASCAT 4200, 6.88 g, commercially available from PMC ORGANOMETALLIX INC.).

TABLE 2

Cure system Formulations

| Ingredient | Description | B1 | B2 |
|---|---|---|---|
| | | Weight, g | |
| Amino silane | KH-550 | 68 | 65.15 |
| Amino silane | KH-540 | 27 | 27.97 |
| Catalyst | TYZOR TNBT TITANATE | 5 | |
| Catalyst | FASCAT 4200 | | 6.88 |
| Total | | 100 | 100 |

Coating Formulations

The coating binder parts and cure system parts as shown in Table 1 and Table 2 were used, wherein the coating compositions were prepared as follows by mixing both parts at a specified ratio: the binder parts and the cure system parts were weighed into a container, and was stirred by a metal doctor blade until thoroughly mixed, thereby providing coating compositions.

For coating formulation 1, base A1 (87 g) and cure system B1 (13 g) were combined with a stoichiometric ratio of 1:1.03.

For coating formulation 2, base A2 (86 g) and cure system B1 (14 g) were combined with a stoichiometric ratio was 1:0.92.

For coating formulation 3, base AR1 (86 g) and cure system B1 (13 g) were combined with a stoichiometric ratio was 1:0.90.

For coating formulation 4, base AR2 (86 g) and cure system B1 (14 g) were combined with a stoichiometric ratio was 1:0.90.

For coating formulation 5, base AR3 (91 g) and cure system B1 (9 g) were combined with a stoichiometric ratio was 1:0.91.

For coating formulation 6, base AR4 (86.5 g) and cure system B1 (13.5 g) were combined with a stoichiometric ratio was 1:0.92.

For coating formulation 7, base A2 (86 g) and cure system B2 (14 g) were combined with a stoichiometric ratio was 1:0.92.

For coating formulation 8, base AR5 (83 g) and cure system B1 (17 g) were combined with a stoichiometric ratio was 1:0.84.

Property Tests

A film scraper with a 150 μm opening was used to scrape coat the resulting polysiloxane coating mixture onto a glass bar, and drying property of said coating was tested (ASTM D1640).

A DEVILBISS® spray gun was used to spray coat the resulting polysiloxane coating composition onto an aluminum panel, and the coating was completely cured at room temperature. The coating was test in regard to flexibility (tapered mandrel, ASTM D522) and weathering resistance (xenon lamp accelerated aging, ISO 4892-2). The sample panel was dried at 23.3° C./50% RH conditions for 14 days when testing the flexibility.

60 degree angle gloss change was also measured at initial stage, 10 weeks and 20 weeks after starting the accelerated aging (ISO 2813).

The resulting polysiloxane coating composition was applied onto a glass panel, and the coating was made to be completely cured at room temperature. Then the abrasion resistance of said coating was tested (ASTM D 4060, CS17 wheel, 1 KG load, abrasion resistance 1000 rounds).

The resulting polysiloxane coating composition was applied onto a sand blasted Sa2.5 steel panel coated with a 60-micron zinc-rich epoxy primer and a 140-micron epoxy intermediate coating, and the coating was made to be completely cured at room temperature (23° C.). 7-day chemical resistance (ISO 2812-4) and 3000-hour salt fog resistance (ASTM B117) of the coating were tested, and the surface was evaluated in terms of blistering (ASTM D714), rusting (ASTM D1654), corrosion creep at scoring (ASTM D1654). In ASTM D 714, numbers 10, 8, 6, 4, 2, 0 represent the degree of the blistering (10 (or No) indicating no blistering, and less number indicating bigger blister), and letters D, MD, M, F represent the occasions of the blistering (Dense, Medium dense, Medium, Few). Test results were shown in Table 3.

The data prove that the polysiloxane coating composition made according to the present disclosure demonstrates improved flexibility measured by tapered mandrel extension and possess excellent weathering resistance, abrasion resistance and chemical resistance in comparison with prior art composition.

TABLE 3

Test Results of Coated Panel

| Coating formulation | 1 | 2 | 3 | 4 | 5 | 6 | 7 |
|---|---|---|---|---|---|---|---|
| Stoichiometric ratio of binder part and cure system part | 1:1.03 | 1:0.92 | 1:0.90 | 1:0.90 | 1:0.91 | 1:0.92 | 1:0.92 |
| Tacky Dry, ASTM D1640 (hour) | 1 h | 1 h | 1 h | 1 h | 2 h | 1 h | 0.5 h |
| Dry Hard, ASTM D1640 (hour) | 6 h | 6 h | 5.5 h | 5.5 h | 8 h | 6 h | 3 h |
| Abrasion Resistance, ASTM D 4060 | 85 mg | 89 mg | 90 mg | 89 mg | 130 mg | 90 mg | 88 mg |

TABLE 3-continued

| Test Results of Coated Panel | | | | | | | |
|---|---|---|---|---|---|---|---|
| Coating formulation | 1 | 2 | 3 | 4 | 5 | 6 | 7 |
| % extension of tapered mandrel @ −5 degree, ASTM D522 | | | | | | | |
| Dry for 14 days @23.3° C./ 50% RH | 16.6% | 17.3% | 16.7% | 17.0% | 16.5% | 16.75% | 16.7% |
| Chemical Resistance, according to ISO 2812-4 | | | | | | | |
| 5% sulfuric acid, surface blistering, ASTM D714 | No | No | No | No | 6M | No | No |
| 5% sodium hydroxide, surface blistering, ASTM D714 | No | No | No | No | 6M | No | No |
| Salt fog test, according to ASTM B117 | | | | | | | |
| Surface Bubble, ASTM D714 | No | No | No | No | No | No | No |
| Surface rusting, ASTM D1654 | No | No | No | No | No | No | No |
| Scoring corrosion width, mm, ASTM D1654 | 1.7 | 1.8 | 2.0 | 2.1 | 2.3 | 1.8 | 1.8 |
| Accelerated aging -Xenon lamp -ISO 4892-2 | | | | | | | |
| 60 degree gloss -initial | 91 | 93 | 89 | 92 | 92 | 89 | 92 |
| 10 weeks later | 90 | 88 | 80 | 79 | 87 | 86 | 89 |
| 20 weeks later | 83 | 80 | 71 | 70 | 80 | 79 | 81 |

Moreover, for coating formulation 8, the 60 degree gloss after scrape coating on the glass panel was only 55, which became half gloss from high gloss compared with others. Thus, no other property tests were conducted on it.

Although specific formulations of the present invention have been described above for illustrative purposes, those skilled in the art will understand that changes can be made to the different formulations described herein without departing from its broad inventive concept. Therefore, it should be understood that this specification is not limited to the specific embodiments disclosed, but is intended to cover changes within the spirit and scope of the present invention as defined by the appended claims.

What is claimed is:

1. A polysiloxane-based coating composition, comprising:

a polysiloxane of formula I formula I

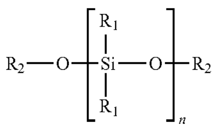

wherein each R1 is independently a hydroxyl group or an alkyl, aryl or alkoxy group having up to 6 carbon atoms, each R2 independently is hydrogen or alkyl or aryl group having up to 6 carbon atoms, and n is selected so that the molecular weight for the polysiloxane is 400 to 10000, wherein the polysiloxane of formula I makes up at least 90 wt. % of all polysiloxane components in the coating composition;

a non-aromatic epoxide resin having more than one 1,2-epoxide group per molecule with an epoxide equivalent weight of 100 to 5000;

a multi-functional (meth)acrylate monomer; and a cure system comprising at least one alkoxy functional aminosilane.

2. The coating composition according to claim 1, wherein the non-aromatic epoxide resin comprises a non-aromatic hydrogenated epoxy resin.

3. The coating composition according to claim 1, wherein the multi-functional (meth)acrylate monomer comprises a monomer compound having at least 2, 3 or 4 or more (meth)acrylate groups bonded laterally or terminally to the backbone having a cyclic, linear or branched aliphatic or cycloaliphatic hydrocarbon group, wherein the aliphatic or cycloaliphatic hydrocarbon group comprising C and H atoms and optionally one or more heteroatoms such as O atom.

4. The coating composition according to claim 1, wherein the multi-functional (meth)acrylate monomer comprises trimethylol propane tri(meth)acrylate, tripropylene glycol tri(meth)acrylate, dipropylene glycol di(meth)acrylate, butylene glycol di(meth)acrylate, cyclohexane dimethanol di(meth)acrylate, hexanediol di(meth)acrylate, glycerol tri (meth)acrylate, pentaerythritol tetra(meth)acrylate, ditrimethylolpropane tri(meth)acrylate, neopentyl glycol di(meth) acrylate, neopentyl glycol propoxylate di(meth)acrylate, ethoxylated trimethylolpropane tri(meth)acrylate, and/or propoxylate glycerol tri(meth)acrylate.

5. The coating composition according to claim 1, wherein the multi-functional (meth)acrylate monomer comprises hexanediol di(meth)acrylate, cyclohexane dimethanol di(meth)acrylate, and/or trimethylol propane tri(meth)acrylate.

6. The coating composition according to claim 1, wherein the at least one alkoxy functional aminosilane includes at least one dialkoxy functional aminosilane and/or at least one trialkoxy functional aminosilane.

7. The coating composition according to claim 6, wherein the trialkoxy functional aminosilane comprises aminopropyl trimethoxy silane, aminopropyl triethoxy silane, aminopropyl tripropoxy silane, aminoneohexyl trimethoxy silane, N-β-aminoethy1-y-aminopropyl trimethoxy silane, N-β-aminoethy1-y-aminopropyl triethoxy silane, N-phenylaminopropyl trimethoxy silane, trimethoxysilyl propyl diethylenetriamine, 3-(3-aminophenoxy) propyl trimethoxy silane, aminoethyl aminomethyl phenyl trimethoxysilane, 2-aminoethyl-3-aminopropyl-tri-2-ethylhexyloxy silane, N-aminohexylaminopropyl trimethoxy silane, and/or 3-aminopropyl tris(methoxyethoxy)silane.

8. The coating composition according to claim 1, wherein the cure system comprises at least 80 wt %, of alkoxy functional aminosilane.

9. The coating composition according to claim 1, wherein the coating composition comprises 12-65 wt % of the polysiloxane of formula I, 8-30 wt % of the non-aromatic epoxide resin, 1-12 wt % of the multi-functional (meth) acrylate monomer, and 5-40 wt % of the cure system, based on the total weight of the coating composition.

10. The coating composition according to claim 1, wherein the coating composition comprises 2-8 wt % of multi-functional (meth)acrylate monomer, based on the total weight of the coating composition.

11. The coating composition according to claim 1, wherein the coating composition further contains no more than 15 wt % of a curing accelerator and/or no more than 15 wt % of a flexible epoxy resin based on the glycidyl ether of castor oil having an epoxide equivalent weight of 200 to 1000, based on the total weight of the coating composition.

12. The coating composition according to claim 1, wherein the coating composition is substantially free or completely free of epoxy-(meth)acrylate and/or urethane (meth)acrylate.

13. The coating composition of claim 1, wherein the polysiloxane of formula I makes up 95 wt. % to 100 wt. % of all polysiloxane components in the coating composition.

14. The coating composition of claim 1, wherein the multi-functional (meth)acrylate monomer is not a urethane (meth)acrylate and wherein the multi-functional (meth)acrylate monomer is included at 1-12 wt. % based on total weight of the coating composition.

15. A polysiloxane-based coating composition, comprising:

a polysiloxane of formula I formula I

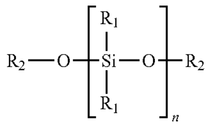

wherein each R1 is independently a hydroxyl group or an alkyl, aryl or alkoxy group having up to 6 carbon atoms, each R2 independently is hydrogen or alkyl or aryl group having up to 6 carbon atoms, and n is selected so that the molecular weight for the polysiloxane is 400 to 10000;

a non-aromatic epoxide resin comprising more than one 1,2-epoxide group per molecule with an epoxide equivalent weight of 100 to 5000;

a multi-functional (meth)acrylate monomer, wherein the multi-functional (meth)acrylate monomer is not a urethane (meth)acrylate and wherein the multi-functional (meth)acrylate monomer is included at 1-12 wt. % based on total weight of the coating composition; and a cure system comprising at least one alkoxy functional aminosilane.

16. A multi-part polysiloxane-based coating composition, comprising:

a binder part A comprising a polysiloxane of formula I formula I

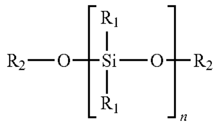

wherein each R1 is independently a hydroxyl group or an alkyl, aryl or alkoxy group having up to 6 carbon atoms, each R2 independently is hydrogen or alkyl or aryl group having up to 6 carbon atoms, and n is selected so that the molecular weight for the polysiloxane is 400 to 10000, wherein the polysiloxane of formula I makes up at least 90 wt. % of all polysiloxane components in the coating composition;

a non-aromatic epoxide resin having more than one 1,2-epoxide group per molecule with an epoxide equivalent weight of 100 to 5000; and a multi-functional (meth)acrylate monomer, and a part B comprising a cure system comprising at least one alkoxy functional aminosilane.

17. The multi-part coating composition according to claim 16, wherein the ratio of binder part A to part B is such that a ratio of an amino equivalent to the sum of epoxy equivalent plus double-bond equivalent in the multi-functional (meth)acrylate monomer is 0.7:1.0 to 1.3:1.0.

18. A coated substrate comprising at least one surface coated at least in part with the polysiloxane-based coating composition according to claim 1.

19. The coated substrate according to claim 18, wherein the substrate comprises wood, plastics, concrete, glass, or metal.

20. A method for protecting a surface of a substrate comprising:

applying the polysiloxane-based coating composition of claim 1 to a surface of a substrate.

* * * * *